March 22, 1927. 1,621,916
C. H. WILLIAMS ET AL
HYDRAULIC STEERING GEAR
Filed June 23, 1925 2 Sheets-Sheet 1
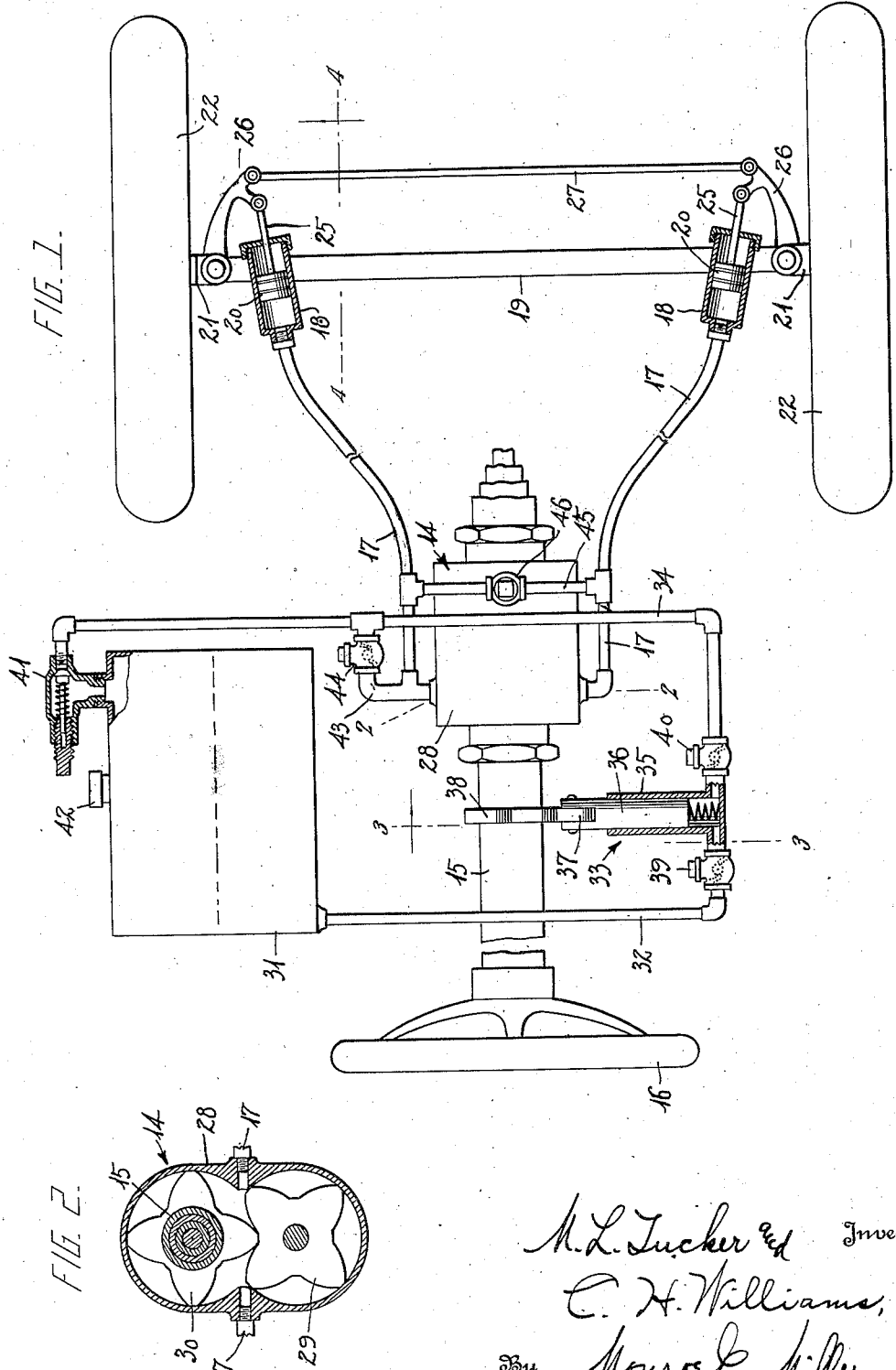

March 22, 1927.                              1,621,916
C. H. WILLIAMS ET AL
HYDRAULIC STEERING GEAR
Filed June 23, 1925          2 Sheets-Sheet 2

M. L. Tucker and
C. H. Williams, Inventors
By Monroe E. Miller
Attorney.

Patented Mar. 22, 1927.

1,621,916

UNITED STATES PATENT OFFICE.

CHARLES H. WILLIAMS AND MAURICE L. TUCKER, OF PIQUA, OHIO.

HYDRAULIC STEERING GEAR.

Application filed June 23, 1925. Serial No. 39,156.

The present invention relates to steering gear for automobiles and other vehicles, and aims to provide a novel hydraulic steering gear between the hand wheel or manually operated steering member and the vehicle wheels or their equivalents which are angled for purpose of steering the vehicle, so as to eliminate lost motion and loose play, and obtain other advantages.

Another object of the invention is the provision of a novel hydraulic connection between the hand operated steering member and the wheels of the running gear which are used for steering, in order that said wheels may be angled conveniently and efficiently.

A further object is the provision of such a hydraulic steering gear provided with novel means for keeping the hydraulic means supplied with liquid and maintaining said liquid under a desired pressure, in order to avoid lost motion in the steering gear.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a diagrammatical view of the improved steering gear, portions being shown in section.

Figs. 2, 3 and 4 are sections on the respective lines 2—2, 3—3 and 4—4 of Fig. 1.

Figure 3:
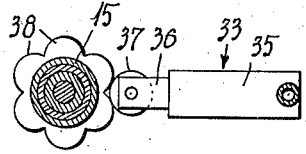
Figure 4:
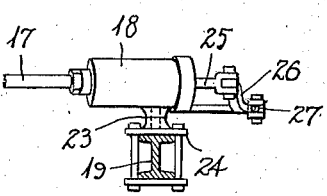

In carrying out the invention, a force pump 14 is operated by the steering shaft 15 which carries the hand wheel 16, and the opposite ports of the pump 14 are connected by conduits 17 with cylinders 18 mounted on the axle 19. As shown, the steering gear is used in an automobile or motor vehicle, 19 being the front axle and portions of the conduits 17 may be of rubber or other flexible hose to permit the cylinders 18 to move with the axle 19 without disturbing the operative connections between said cylinders and the pump. Pistons 20 work in the cylinders 18 and said pistons and cylinders constitute liquid operated means which are operably connected with the spindles or controlled members 21 which are pivotally connected with the ends of the axle and on which the wheels 22 are mounted for rotation, said spindles 21 and wheels 22 constituting means adapted for steering the vehicle. As shown in Fig. 4, each cylinder 18 is mounted pivotally on the axle 19 so that the cylinder may turn about a vertical axis. Thus, each cylinder 18 is pivoted, as at 23, on a clamp 24 embracing the axle 19. The piston rods 25 of the pistons 20 are pivotally connected with arms 26 of the spindles 21, which may be the arms which are conected by the tie rod 27 as usual to cause the wheels 22 to be angled simultaneously.

The pump 14, as shown in Fig. 2, comprises a casing 28 in which the interengaging gear-shaped impellers 29 and 30 are mounted, whereby the rotation of said impellers will force the liquid into one conduit 17 and pump the liquid from the other conduit. As shown, the steering shaft 15 extends through the pump and has the impeller 30 secured thereon whereby the pump is associated directly with the steering shaft. The steering shaft, as usual, is tubular and has other shafts nested therein for controlling the spark, throttle and other devices. It will therefore be apparent that when the steering wheel 16 is rotated in one direction, the impellers of the pump 14 are rotated in one direction so as to withdraw liquid from one conduit 17 and force liquid into the other conduit 17. This pumps liquid from one cylinder 18 and forces it into the other cylinder 18, so that the pistons 20 are moved in opposite directions to turn the spindles 21 in the corresponding direction. When the hand wheel 16 is rotated in the other direction the pumping of the liquid through the conduits 17 is reversed, thereby angling the wheels 22 in the opposite direction.

In order to keep the hydraulic connection between the spindles 21 and shaft 15 supplied with liquid, a liquid reservoir 31 is provided, being preferably located at a higher level than the pump 14. A liquid flow pipe 32 leads from the bottom of the reservoir 31 to a pump 33, and a return pipe 34 leads from said pump 33 to the reservoir 31. The pump 33, as shown, comprises a cylinder 35 connected between the pipes 32 and 34, and a piston or plunger 36 working in said cylinder. The pump 33 is operated by the rotation of the steering shaft 15. Thus, the plunger 36 has a roller 37 to be operated by cams 38 on the shaft 15, whereby the manual rotation of the steering shaft 15 in opposite directions will reciprocate the plunger 36. Check valves 39 and 40 are located between the pipes 32 and 34 and the cylinder 35, respectively, to prevent reverse flow of the liquid. A pressure valve 41 is connected between the return pipe 34 and reservoir 31, preferably at the top of the reservoir above the liquid therein. The reservoir 31 has a removable filling cap 42 for convenience in filling the reservoir with oil or other liquid used. A connection 43 is made between the pipe 34 and one of the conduits 17 and contains a check valve 44 permitting liquid to flow from the pipe 34 into the conduits 17 and pump 14, but preventing reverse flow.

Whenever the shaft 15 is rotated this will operate the pump 33, to pump liquid from the reservoir 31 and force the liquid through the pipe 34. The pressure valve 41 will resist the return of the liquid into the reservoir 31, thereby obtaining the desired pressure, according to the adjustment of the valve 41. If any of the liquid leaks from the conduits 17, cylinders 18 and pump 14, liquid will immediately be forced from the pipe 34 through the valve 44 into the conduits 17 and pump 14, and the pressure of the liquid in the pipe 34 will also maintain the liquid under pressure in the conduits 17, pump 14 and cylinders 18, thereby assuring of the efficient operation of the steering gear. Surplus liquid pumped by the pump 33 will flow back into the reservoir 31 when the pressure rises above that for which the valve 41 is adjusted, thereby causing a circulation of the liquid from the reservoir 31 to the pump 33 and back to the reservoir, and maintaining a pressure on the liquid in the conduits 17 and pump 14.

A by-pass 45 connects the conduits 17 and has a manually operable valve 46 which is normally closed. By opening the valve 46 the liquid will by-pass from one side of the pump to the other. This may be used for adjusting the pistons 20 and shaft 15 relatively to one another, and may also be used for preventing unwarranted operation of the machine. Thus, by securing the valve 46 in open position, it will be impossible to steer the car, inasmuch as the control between the pump 14 and pistons 20 is lost, the liquid flowing through the by-pass 45 when the pump is operated.

Figure 5:
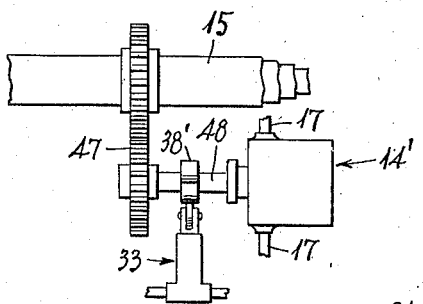
Fig. 5 is an elevation illustrating a modification in the pump drive.

As shown in Fig. 5, the force pump 14' may be located at one side of the steering shaft 15, with any suitable gear connection 47 between the shaft 15 and the shaft 48 of the pump 14'. The pump 33 is operated by cams 38' on the pump shaft 48.

Figure 6:
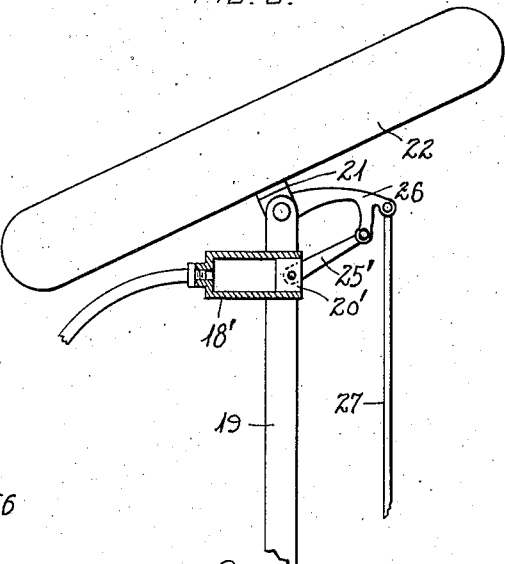
Fig. 6 is a fragmentary view illustrating a modification in the wheel angling device.

Fig. 6 illustrates the cylinder 18' fixed rigidly on the axle 19, and a link 25' connects the piston 20' and arm 26 of the spindle 21, permitting said link to swing relatively to the piston when the piston is reciprocated.

Figure 7:
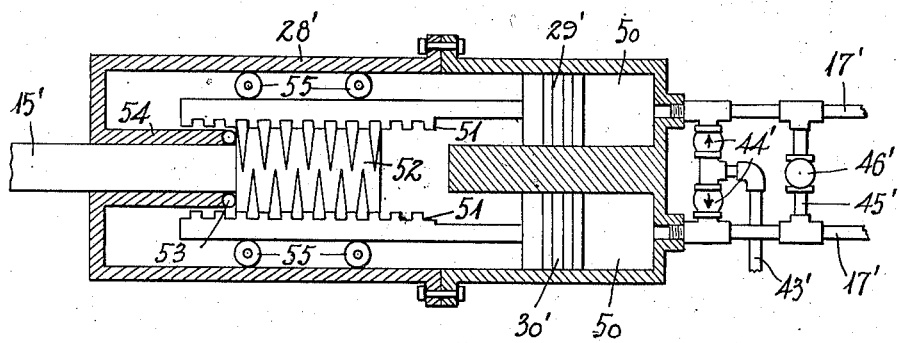
Fig. 7 is a sectional view illustrating a modified form of force pump to be operated by the steering wheel or member.

Fig. 7 illustrates a double acting force pump operated by the steering shaft 15'. The pump comprises a casing 28' having parallel cylinders 50 in which the pistons 29' and 30' work, and the conduits 17' are connected to the cylinders 50. A pipe 43' is connected by way of check valves 44' with the conduits 17' for forcing oil or liquid under pressure into the conduits and cylinders. The check valves 44' resemble the check valve 44 hereinbefore described, to permit liquid to be forced into the conduits 17' but preventing reverse flow from said conduits. A by-pass 45' also connects the conduits 17' and has a hand valve 46'. Worm racks 51 are connected to the pistons 29' and 30' and engage a double screw or worm 52 having screw-threads extending in opposite directions, and said double screw 52 is secured on the shaft 15', so that when said shaft is rotated the racks 51 and pistons are reciprocated in opposite directions, thereby drawing the liquid from one conduit 17' and forcing the liquid into the other conduit. Anti-friction balls 53 are disposed between the end of the screw 52 and a bearing 54 with which the casing 28' is formed at one end to receive the shaft 15'. Anti-friction rollers 55 are also preferably disposed between the racks 51 and wall of the casing 28' to hold said racks in engagement with the screw 52 and provide for free reciprocatory motion of said racks.

Figure 8:
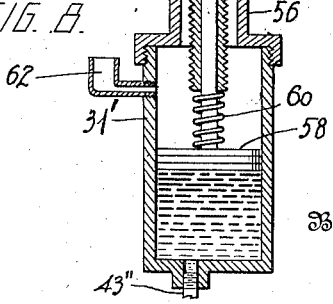
Fig. 8 is a sectional view illustrating a modified form of device for supplying the liquid under pressure.

Fig. 8 illustrates a modified form of device for supplying the oil or liquid under pressure through the pipe 43" into the force pump and conduits, the pipe 43" leading from the bottom of the reservoir 31' which is a cylinder having a cap 56. A tubular adjusting screw 57 is screw-threaded through the cap 56, and a piston 58 works in the reservoir or cylinder 31' and has a piston rod 59 extending upwardly through the screw 57. A coiled spring 60 surrounds the piston rod 59 and is confined between the piston 58 and screw 57 to supply pressure for moving the piston 58 downwardly. The screw 57 is screwed downwardly in order to compress the spring 60 and thereby supply the pressure on the piston 58 to force the liquid from the cylinder or reservoir 31'. The piston rod 59 has a collar or stop 61 at its upper end so that when the screw 57 is unscrewed the piston rod 59 and piston 58 will be raised. A filling funnel 62 is secured to the wall of the reservoir cylinder 31', and when the piston 58 is raised above the spout of the funnel 62, oil or other liquid may readily be poured through the funnel into the reservoir below the piston, and when the piston is moved downwardly below the funnel 62 this will trap the liquid in the reservoir and force it down through the pipe 43".

Having thus described the invention, what is claimed as new is:—

1. A steering gear comprising manually operable means; steering means; a hydraulic connection between said means including a liquid pump operated by said manually operable means, and liquid operated means connected with and operated by said pump and operably connected with said steering means; and means for supplying liquid under pressure to said pump and liquid operated means including a pump operated by said manually operable means.

2. A steering gear comprising manually operable means; steering means; a hydraulic connection between said means including a liquid pump operated by said manually operable means, and liquid operated means connected with and operated by said pump and operably connected with said steering means; a liquid reservoir; a pump operably connected with said manually operable means and having connections with said reservoir for pumping liquid from and back into said reservoir; a pressure valve controlling the flow of liquid from the second named pump to the reservoir; and a check-valved connection between the second named pump and pressure valve with the first named pump and liquid operated means.

3. A steering gear comprising manually operable means; steering means; a hydraulic connection between said means including a liquid pump operated by said manually operable means, and liquid operated means connected with and operated by said pump and operably connected with said steering means; a liquid reservoir; a pump operably connected with said manually operable means; a liquid flow pipe leading from the reservoir to the second named pump; a liquid return pipe leading from the second named pump to the reservoir; a pressure valve controlling the flow of liquid from the return pipe to the reservoir; and a connection between said return pipe and the first-named pump and liquid operated means including a check valve.

4. A steering gear comprising a rotary shaft; a controlled member adapted for steering; a hydralulic connection between said shaft and member including a liquid pump operated by said shaft, and liquid operated means connected to and operated by said pump and operably connected with said member; and means for supplying liquid under pressure into said hydraulic connection including a pump operably connected with said shaft.

5. The combination with a vehicle axle, a wheel spindle pivotally connected therewith, and a steering shaft, of a liquid pump operably connected with said shaft, a cylinder on the axle a piston working in said cylinder connected to said spindle, a conduit connecting said cylinder and pump, and means for supplying liquid under pressure into said conduit, cylinder and pump including a pump operably connected with said shaft.

6. The combination with a vehicle axle, wheel spindles pivotally connected with the axle, and a steering shaft, of a liquid pump operably connected with said shaft, cylinders on said axle pistons working in said cylinders connected to said spindles, conduits connecting said cylinders and pump, a liquid reservoir, a pump operably connected with said shaft, a liquid flow pipe leading from the reservoir to the last named pump, a liquid return pipe leading from the last named pump to the reservoir, a pressure valve controlling the flow of liquid from the return pipe to the reservoir, and a connection between said return pipe and one of said conduits including a check valve.

7. A steering gear comprising a rotary shaft, a controlled member adapted for steering, a hydraulic connection between said shaft and member, a pump for supplying liquid to said hydraulic connection and having a reciprocatory member, and cams on said shaft arranged for reciprocating said reciprocatory member.

8. A steering gear comprising a rotatable shaft; a controlled member adapted for steering; a hydraulic connection between said shaft and member including a liquid pump operated by said shaft, and liquid operated means connected to and operated by said pump and operably connected with said member; a liquid reservoir; a pump operably connected with said shaft and having connections with said reservoir for pumping liquid from and back into the reservoir; a pressure valve controlling the flow of liquid from the second pump back into the reservoir; and a check-valved connection leading from between the second named pump and pressure valve to the hydraulic connection.

In testimony whereof we hereunto affix our signatures.

CHARLES H. WILLIAMS.
MAURICE L. TUCKER.